US005406982A

United States Patent [19]

Phillips et al.

[11] Patent Number: 5,406,982

[45] Date of Patent: Apr. 18, 1995

[54] FLOW AND PRESSURE REDUCER

[75] Inventors: Edward L. Phillips, 23 Pepperwood Crescent, Kitchener, Ontario, Canada, N2A 2R4; Robert H. Brunst, Acton, Canada

[73] Assignee: Edward L. Phillips, Kitchener, Canada

[21] Appl. No.: 112,023

[22] Filed: Aug. 26, 1993

[30] Foreign Application Priority Data

Aug. 26, 1992 [CA] Canada ................................ 2076919

[51] Int. Cl.$^6$ ................................ F16L 55/04

[52] U.S. Cl. ................................ 138/26; 138/42

[58] Field of Search ................ 138/42, 26, 40, 43, 138/45, 46; 73/707

[56] References Cited

U.S. PATENT DOCUMENTS

| | | | |
|---|---|---|---|
| 42,049 | 3/1864 | Martin | 138/42 X |
| 993,831 | 5/1911 | Junggren | 138/42 X |
| 1,038,262 | 9/1912 | Anstice | 138/42 X |
| 1,087,883 | 2/1914 | Loomis | 138/42 |
| 1,143,639 | 6/1915 | Loomis | 138/42 X |
| 1,622,843 | 3/1927 | Price et al. | 138/42 X |
| 1,868,018 | 7/1932 | Miner | 138/42 |
| 1,904,615 | 4/1933 | Bristol et al. | 138/42 X |
| 1,941,613 | 1/1934 | McDonell | 138/42 |
| 2,120,001 | 6/1938 | Ribble | 138/42 X |
| 2,455,298 | 11/1948 | Cahenzli, Jr. | 138/42 |
| 2,804,093 | 8/1957 | Scherer | 138/26 |
| 3,346,117 | 10/1967 | Page, Jr. | 138/42 X |
| 3,581,773 | 8/1969 | Warren | 138/26 |
| 4,022,384 | 5/1977 | Hoyle et al. | 138/42 X |

*Primary Examiner*—David A. Scherbel
*Assistant Examiner*—Patrick F. Brinson
*Attorney, Agent, or Firm*—Jeffrey T. Imai; Arne I. Fors; D. Doak Horne

[57] ABSTRACT

The reducer device comprises a tubular housing having end caps and having an inlet and outlet end. An inlet barb is mounted on the end cap at the inlet of the housing and adapted to sealingly connect with a supply line. An outlet barb is mounted on the end cap at the outlet end of the housing and adapted to sealingly connect with a delivery line. A primary spiral tube extends axially within the tubular housing from the inlet end to the outlet end. An inlet tube is connected to the inlet barb and extends through the spiral of the primary spiral tube integrally joining with the outlet end of the primary spiral tube. An outlet tube is connected to the outlet barb and extends through the spiral of the primary spiral tube integrally joining with the inlet end of the primary spiral tube. Upon closing the end caps on the housing, the ends of the primary spiral tube are urged apart.

7 Claims, 7 Drawing Sheets

FLOW AND PRESSURE REDUCER

FIELD OF THE INVENTION

This invention relates to a device for controlling the pressure and flow of water in fluid systems.

BACKGROUND OF INVENTION

Pumps are used to transport processed water or fluid systems in various industrial applications. These pumps are driven by electrical motors coupled to the pump. The shaft will extend through a gland or stuffing box to separate the wet environment of the pump from the dry environment of the electrical motor.

Gland packings or stuffing box seals will wear out after time due to the abrasive effects of the rotating shaft and the frictional heat which builds up in the gland or stuffing box itself. Process or quench water is introduced into the gland or stuffing box to act as a lubricant to reduce the frictional wear on the gland or stuffing box. The water not only acts as a lubricant but also flushes away harmful debris and improves the mechanical seals.

A sealed water line is used to deliver the water to the gland or stuffing box. The gland water flow rates and pressure must be controlled in order to maximize the effectiveness of the water.

Various devices are commonly used for controlling flow and pressure. Needle valves, gate or globe valves, ball valves, flow meters and fixed orifice pipe unions are all used for controlling flow and pressure. All of these devices use a sliding or fixed member which can be adjusted to control the limit of flow through the controlled area. These devices are prone to clogging since a very small cross-sectional areas are used to pass the water flow in order to reduce the flow or pressure to the desired levels. These devices are known to plug particularly when upstream filters or strainers are not maintained properly. This problem becomes very critical when raw water is used. During spring run-off, the increased levels of sand and silt in the quench water line results in plugging and ultimately results in seal breakdown and costly downtime.

Further, these devices are not well suited to produce fixed flow rates since the devices are primarily designed for variable flow rates. Different technicians may adjust such device increasing water consumption and sewage costs.

Various devices are known which use a long coil of metal tubing to regulate the flow and pressure of a fluid flow. One such device is disclosed in U.S. Pat. No. 2,120,001. In this device, the flow of beer is regulated using a spiral coil. The device will draw beer directly from the keg which retaining the gas and pressure therein but the flow at the faucet will be substantially atmospheric. Such devices produce a satisfactory result if a loosely wound coil is used.

Problems arise during the manufacture of a flow and pressure reducer using a simple coil. During assembly, the end caps of the housing will compress the coil. However, the compression forces at the transition at the beginning and the end of the coil will cause the tubing to become crimped restricting the flow through the device. This result is highly unsatisfactory as the crimp will affect the amount of flow and pressure reduction which has been carefully and accurately calculated. In such cases, the device will have an unpredictable amount of flow and pressure reduction resulting in a high incidence of defective devices.

SUMMARY OF THE INVENTION

The disadvantages of the prior art may be overcome by providing a flow and pressure reducer with a closely wound spiral tube having known characteristics to accurately predict the rate of flow reduction and pressure drop across the device. The closely wound spiral has a structure which prevents the ends of the spiral from becoming crimped during assembly of the device by urging the spiral apart upon closing the housing of the device.

It is also desirable to provide a device with an inlet tube and an outlet tube extending from opposite ends of the closely wound spiral tube. The inlet and outlet tubes extend through the closely wound spiral to the opposite ends of the housing to reduce the angle between the spiral and the inlet and outlet tubes.

According to one aspect of the invention, there is provided a device for controlling flow and pressure of a fluid. The device comprises a tubular housing having end caps and having an inlet and outlet end. An inlet barb is mounted on the end cap at the inlet of the housing and adapted to sealingly connect with a supply line. An outlet barb is mounted on the end cap at the outlet end of the housing and adapted to sealingly connect with a delivery line. A primary spiral tube extends axially within the tubular housing from the inlet end to the outlet end. An inlet tube is connected to the inlet barb and extends through the spiral of the primary spiral tube integrally joining with the outlet end of the primary spiral tube. An outlet tube is connected to the outlet barb and extends through the spiral of the primary spiral tube integrally joining with the inlet end of the primary spiral tube. Upon closing the end caps on the housing, the ends of the primary spiral tube are urged apart.

According to another aspect of the invention, the device further includes an inlet pressure gauge connected to the inlet barb and an outlet pressure gauge connected to the outlet barb. Printed on the housing is a graph of the relationship between pressure differential and flow rate whereby the flow rate is readable from the graph after determining the pressure differential between the inlet and outlet pressure gauges.

According to another aspect of the invention a secondary spiral tube is nested within the primary spiral tube. A secondary inlet barb is mounted on the end cap at the outlet end of the housing. A secondary outlet barb is mounted on the end cap at the inlet end of the housing. A secondary inlet tube is connected to the secondary inlet barb and extends through the spiral of the primary and secondary spiral tubes integrally joining with the inlet end of the secondary spiral tube. A secondary outlet tube is connected to the secondary outlet barb and extends through the spiral of the primary and secondary spiral tube integrally joining with the outlet end of the primary spiral tube.

According to another aspect of the invention, an outlet pressure gauge is connected to the outlet barb and an alarm is connected to the secondary inlet for signalling deviations in pressure readings in the pressure gauge from a predetermined calibrated value.

DETAILED DESCRIPTION OF THE DRAWINGS

In drawings which illustrate embodiments of the invention:

DETAILED DESCRIPTION OF THE INVENTION

Figure 1:
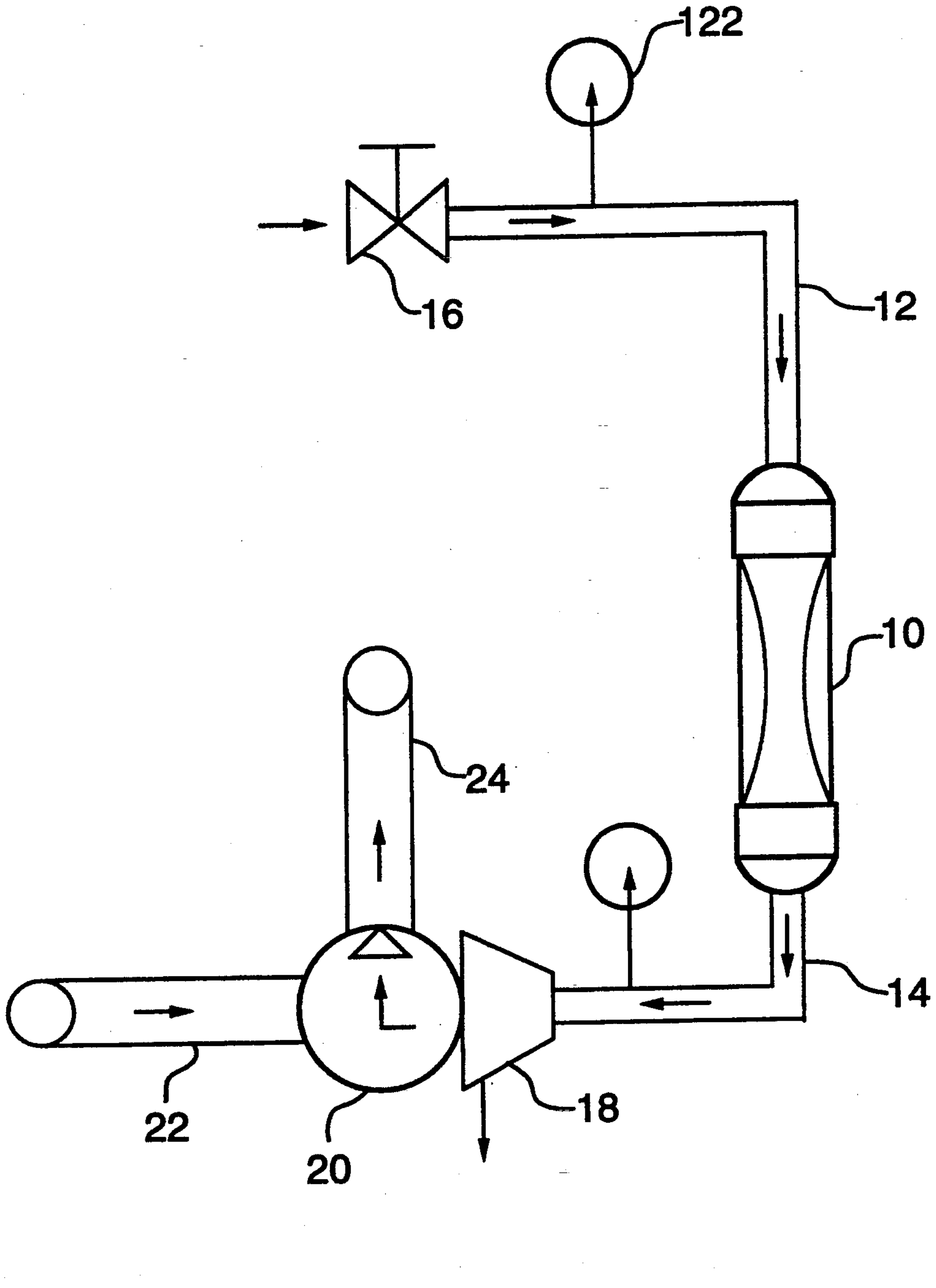
FIG. 1 is a schematic diagram of the preferred embodiment installed in a water line delivering water to a gland.

The typical industrial application of the present invention is illustrated schematically in FIG. 1. The reducer of the present invention is generally illustrated as 10. The reducer 10 is installed in a water line having an supply line inlet pipe 12 and a delivery line outlet pipe 14. A main conventional valve 16 controls the water flow in the water line.

The direction of flow of water is generally illustrated by the arrow. Water is delivered from a source (not illustrated) beyond valve 16 to gland or stuffing box 18. For a single seal type gland, the water from the gland is discharged to a drain at atmospheric pressure.

In packing type seal, the seal water is allowed to weep over the packing and discharge into the suction or pressure side of the pump. The seal water is allowed to mix with the process flow.

Pump 20 is coupled to a shaft extending through a gland to separate the wet environment of the pump with the dry environment of the electric motor (not illustrated). The pump 20 is connected by conventional means to the inlet pipe 22 to the discharge pipe 24. The direction of water flow is generally indicated by the arrows.

Figure 2:
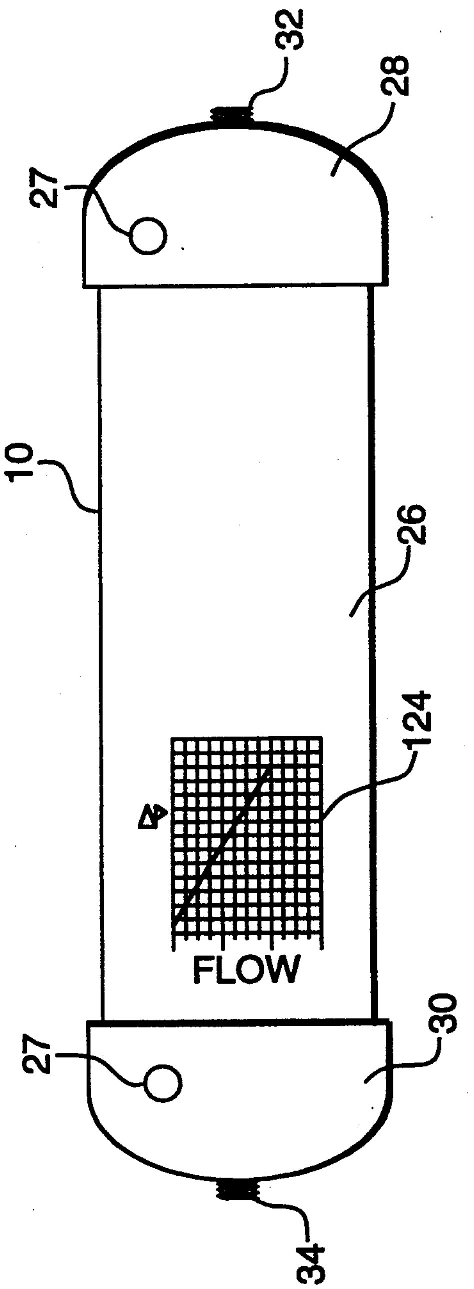
FIG. 2 is a side elevational view of the embodiment of FIG. 1.

Referring to FIG. 2, the reducer 10 has a central tubular housing 26 and an inlet end cap 28 and an outlet end cap 30. Mounted in the end caps 28 and 30 are inlet barbs 32 and outlet barbs 34, respectively. Barbs 32 and 34 are conventional pipe fittings which may be connected to the pipe network (pipes 12 and 14) in a conventional manner.

Inlet barb 32 is mechanically joined to inlet tube 36. Inlet tube 36 extends from the inlet end of the flow reducer 10 substantially the length of the housing 26. At the outlet end of the housing 26, the tube is bent at 38 and coiled in a closely wound spiral forming spiral portion 40. The spiral portion 40 spirals back towards the inlet end of the housing. At the inlet end the tubing is bent at 42 to join outlet tube 44. Outlet tube 44 extends from the inlet region of the housing to the outlet end and is joined mechanically to outlet barb 34.

The angle at which inlet and outlet tubes 36 and 44 meet the spiral portion 40 and the arrangement of the inlet and outlet tubes extending through the spiral portion 40 minimizes the possibility of damage during assembly. The compression of the inlet and outlet tubes 36 and 44 during assembly will urge the spiral portion 40 apart rather than together. Accordingly, the tube is unlikely to crimp during assembly.

Figure 3:
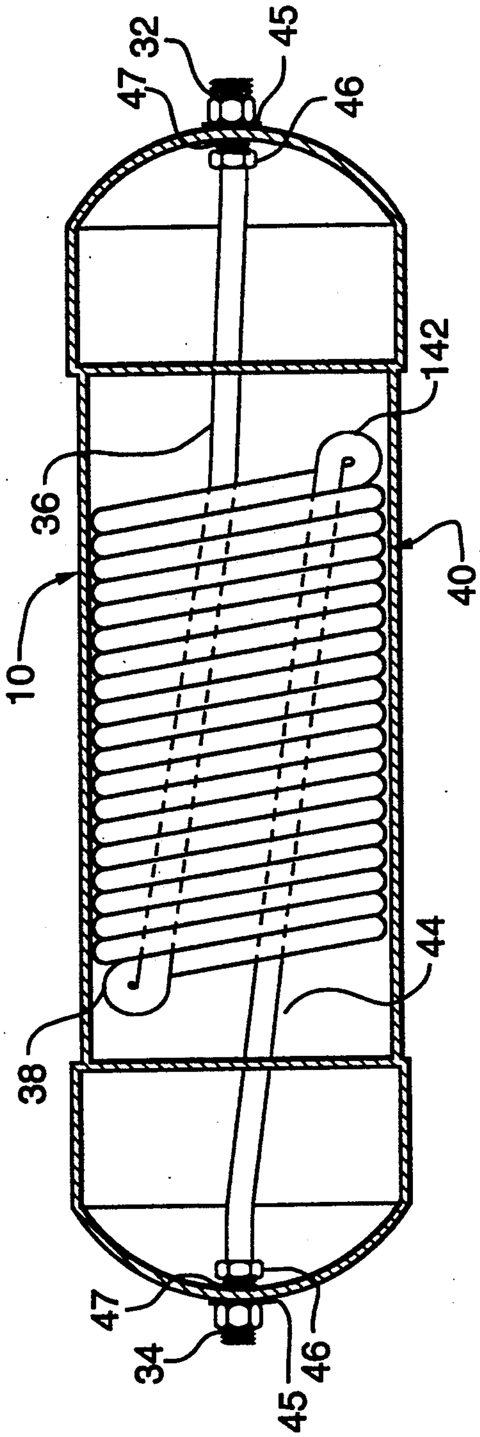
FIG. 3 is a side sectional view of the preferred embodiment.

As illustrated in FIG. 3, inlet tubing 36 and outlet tubing 44 are mechanically joined by fittings 46 and 47 to the inlet barb 32 and the outlet barb 34 respectively. Fittings 46 and 47 thread into each other and have therebetween an internal tooth lock washer 45 which is embedded into end caps 28 and 30. Barbs 32 and 34 are connected to the end caps 28 and 30 respectively, using the external threading on the barb and a suitable lock nut arrangement. Any suitable means of attaching the barb and tubing to the end cap may be used.

As illustrated, the present invention utilizes a vortex to reduce the flow and pressure in the water line in which it is connected. The flow and pressure through the device 10 is generally controlled by three separate parameters, namely, the inside diameter of the tubing, the length of the tubing and the number and diameter of spirals.

In pulp and paper mills, the standard water pressure system runs at approximately 80 psig. The differential pressure required between the inlet and outlet of the flow reducer is approximately 65 psid. The configuration of reducer 10 which will accomplish this pressure differential will have 14 spirals at 2.75 inches in diameter having an inside diameter of the tubing at 0.189 inches and having an overall length of 20 feet.

Figure 8:
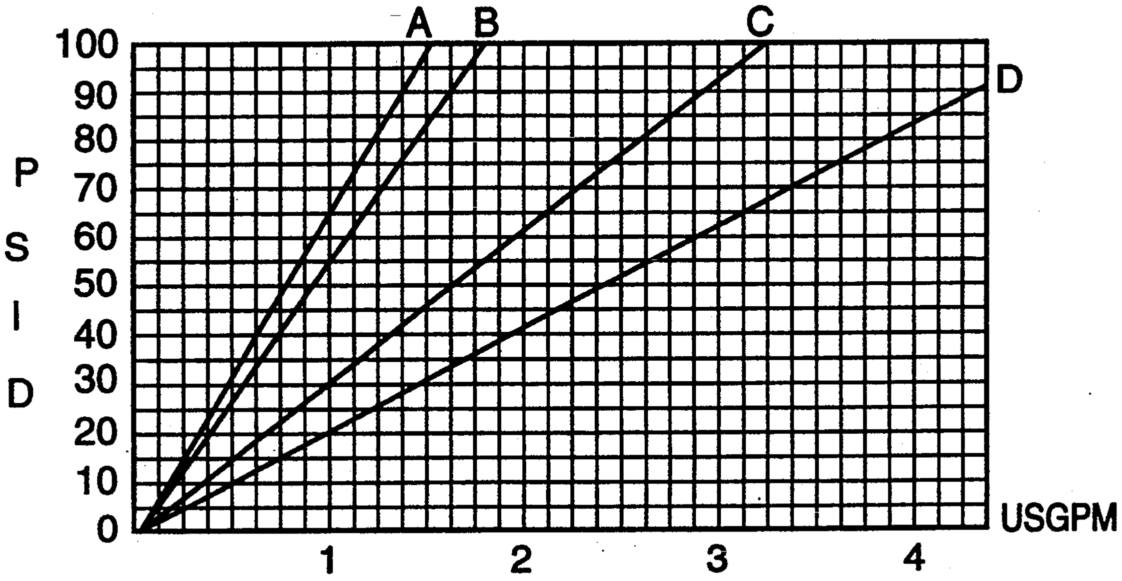
FIG. 8 is a graph illustrating the relationship between differential pressure and flow rate for different lengths of tubing having different number of spirals.

Referring to FIG. 8, the relationship between length, inside diameter and the number of spirals with respect to the differential pressure and the flow rate is illustrated. Line A illustrates the characteristics of a tube length of 20 feet, inside diameter of 0.188 inches with 13 spirals. Line B illustrates the characteristics of a 15 foot tube length with a 0.188 inch inside diameter with 10 spirals. Line C illustrates the characteristics of a 10 foot tube length with a 0.188 inch diameter at 7 spirals. Line D illustrates the relationship between a 5 foot tube length at 0.188 inch diameter with 4 spirals. A reducer of the present invention could be selected by knowing the desired pressure differential and the rate of flow to be achieved at the outlet end of the device.

Applicant has also found that the pressure drop across a known length and inside diameter of straight tubing is increased by 20% when the tubing is formed in a spiral. Accordingly, the flow reduction and pressure differential can be calculated or established using known friction equations. A reducer may be designed to meet any desired specifications.

The housing of the reducer 10 not only protects the tubing from varying ambient conditions but also acts as a containment should the tube rupture. End caps 28 and 30 are provided with vent holes 27. If a rupture occurs in the tubing, the vent holes 27 will allow the fluid to escape at approximately the same rate as it is delivered. In the preferred embodiment, these holes are approximately 0.25 inches in diameter which will allow a flow of less than 3 USGPM.

The connection which attaches the barb to the end cap will provide additional stability to the reducer 10. The increased rigidity will allow the reducer to absorb pressure shocks which may occur.

Figure 4:
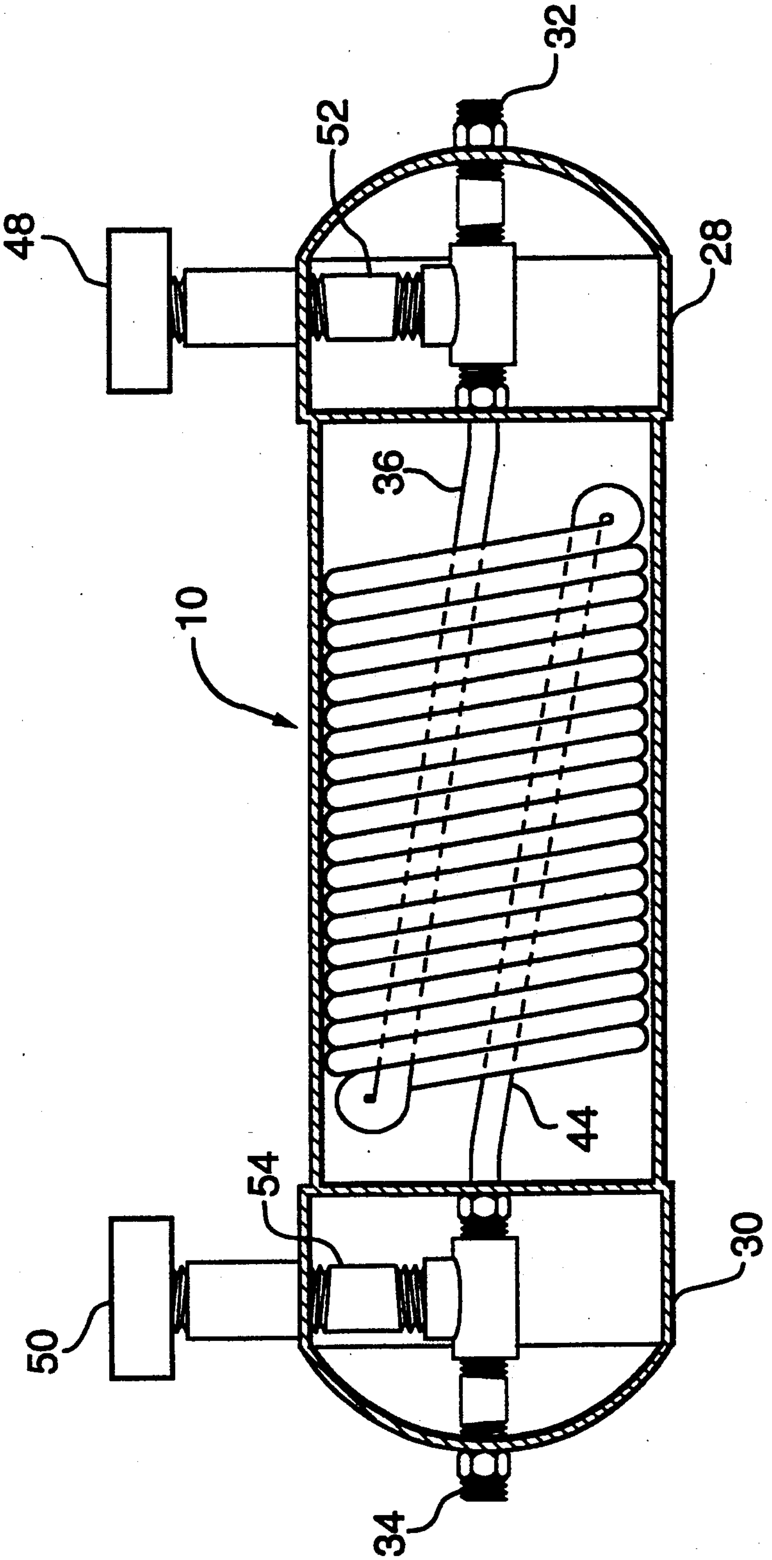
FIG. 4 is a side sectional view of the embodiment of FIG. 1 with optional pressure gauges installed thereon.

Referring now to FIG. 4, the reducer 10 can be provided with an inlet pressure gauge 48 and an outlet pressure gauge 50. Gauges 48 and 50 are mounted onto the end caps 28 and 30 through a T joint 52 and 54. The top of the T is interposed between the inlet tube 36 and the barb 32 or between outlet tube 44 and the outlet barb 34, respectively.

Figure 5:
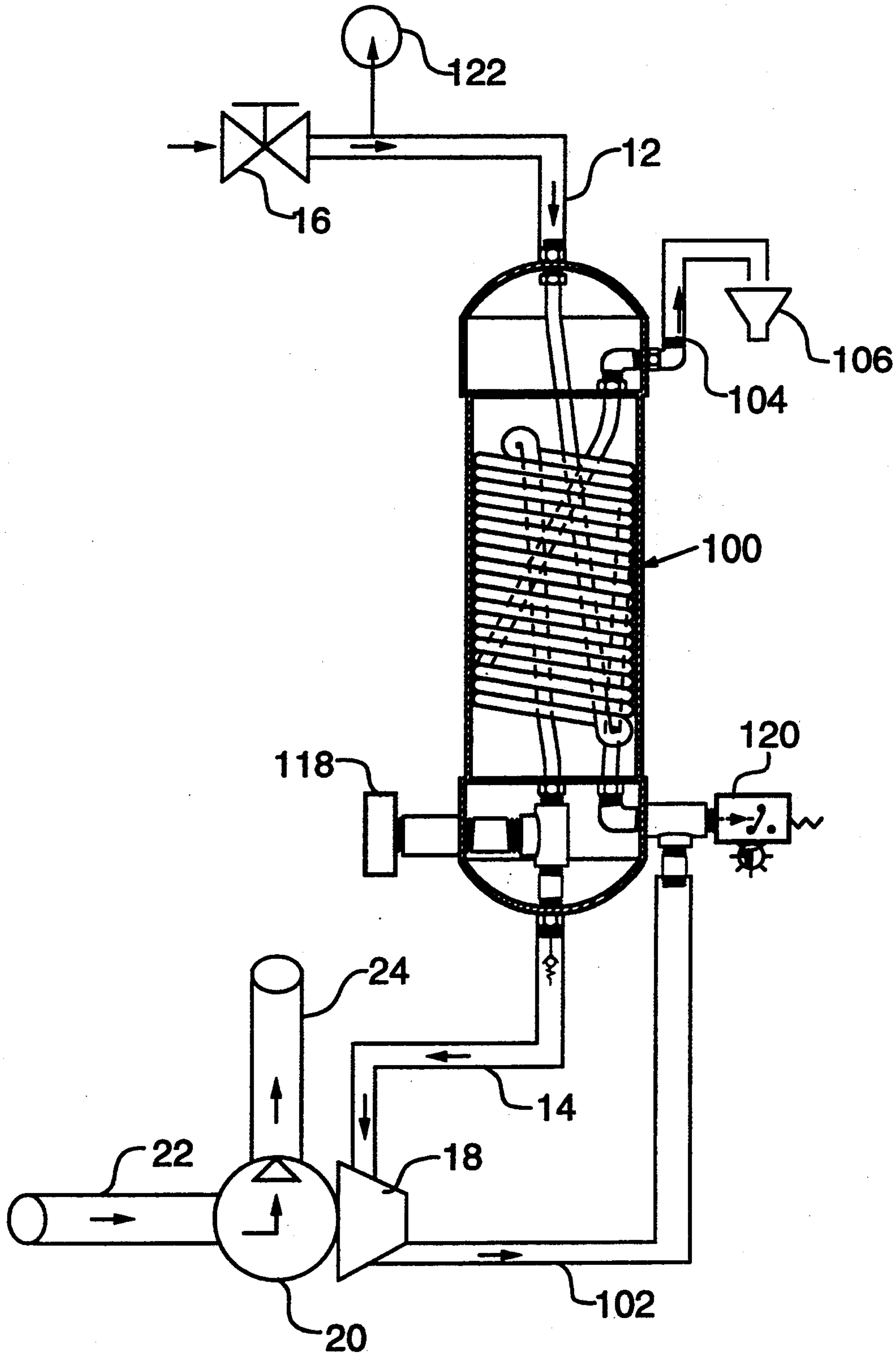
FIG. 5 is a schematic diagram of a second double seal embodiment installed in a water line delivering water to and receiving water from a gland.

Referring to FIG. 5, a double seal arrangement is illustrated schematically. A mechanical seal type gland requires that both the input and the output from the gland be controlled. The process water being pumped through pump 20 will be separated from the seal water passing through gland 18 only if a constant pressure in the stuffing box is be maintained. A constant pressure in the stuffing box must be maintained in these types of systems.

A second embodiment of the invention is generally illustrated as 100. The reducer 100 has a primary length of spiral tube and a secondary length of spiral tube. The primary spiral tube operates identically to the embodiment as illustrated in FIG. 1. The discharge from the gland or stuffing box is directed into pipe 102 and fed back into the secondary spiral tube of reducer 100 which is then connected to pipe 104 for discharge into drain 106.

Figure 6:
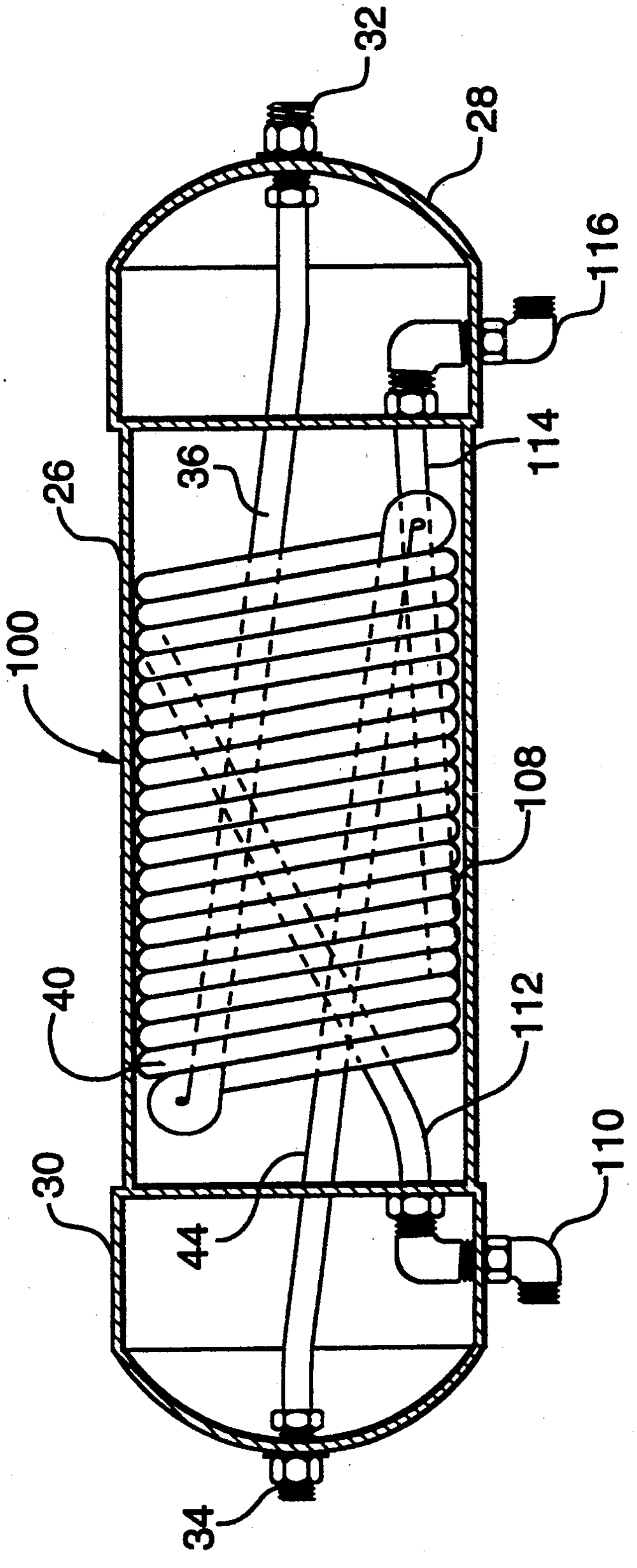
FIG. 6 is a side elevational view of the embodiment of FIG. 5.

Referring now to FIG. 6, the housing of the reducer 100 is identical to that of the first preferred embodiment reducer 10. The primary circuit is identical to the primary circuit of reducer 10 with the exception that the coils are spaced to allow secondary coil 108 to be nested within coil 40 on the primary side.

The secondary inlet barb 110 is mounted on outlet end cap 30. Secondary inlet tube 112 is connected to secondary inlet barb 110. Secondary inlet tube extends substantially along the length of the tubular housing 26. The tubing is then wound closely to form a spiral nested within spiral tube portion 40. The end of the spiral tube portion 108 is connected to secondary outlet tube 114 which extends along the length of the tubular housing 26 until it connects with secondary outlet barb 116.

Using this arrangement, it is possible to control both the inlet flow and pressure into the stuffing box 18 and also the outlet flow and pressure from the stuffing box 18 using a single device. The length and inside diameter of the tubing and also the number and diameter of the spirals can easily be calculated to control both the inlet and outlet flows and pressures.

Figure 7:
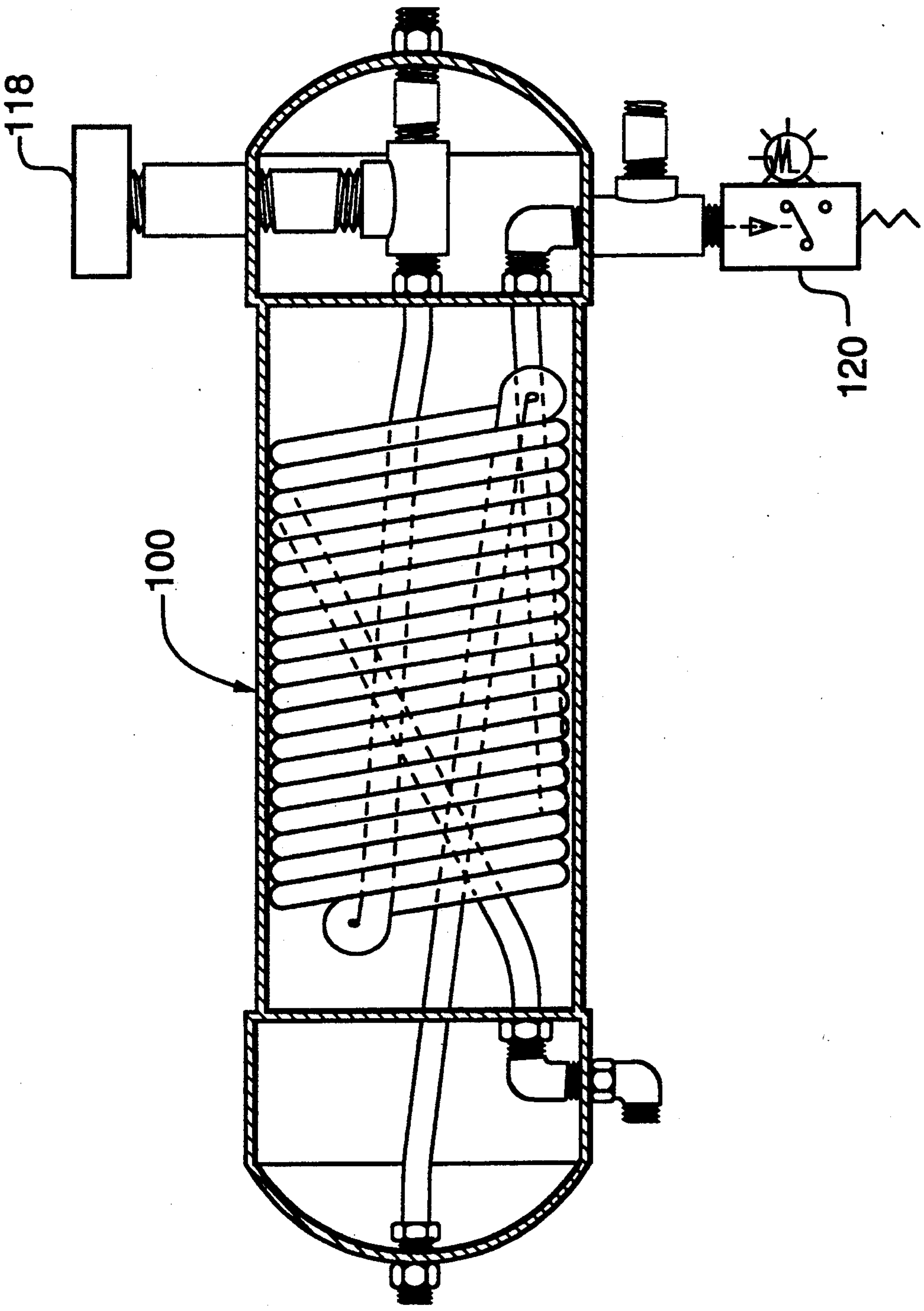
FIG. 7 is a side sectional view of the embodiment of FIG. 5 including a pressure valve and an electrical alarm.

Additionally, as illustrated in FIG. 7, the reducer 100 may be provided with a pressure gauge 118 and an alarm 120.

In the embodiment illustrated in FIG. 5, the pressure gauge 118 is mounted on the outlet end of the primary side and the alarm mounted on the inlet side of the secondary. In this manner, information can be obtained to determine if the seal or the packing is failing.

As the packing erodes, the flow across gland 18 increases due to the less resistance thereacross. Under Boyle's law, an increase in flow results in a decrease in pressure. This decrease in pressure allows the process flow through pipes 22 and 24 to enter the field cavity of gland 18. By knowing the difference in pressure between pressure gauge 122 at the inlet end and the outlet pressure as measured by the pressure gauge 118, the pressure differential can be easily calculated. By using a graph similar to that of FIG. 8, the value of flow can be extracted from such graph. Any changes in the flow indicates that the seal or packing of the stuffing box 18 is failing and remedial measures must be taken.

For convenience, a flow graph 124 may be imprinted onto the external surface of the housing 26 as illustrated in FIG. 2.

Alternatively, electrical pressure gauges could be used in order to send electrical signals to a central control room. Electrical signals can be in the form of gauge pressures, differential pressures or merely signals indicating that the pressure has changed from its calibrated setting. The signals can also be used to set off audible or visual alarms which would indicate that maintenance is required.

For mechanical seal type glands, a constant pressure is required to keep the process water flowing through pipes 22 and 24 sealed from the seal water flowing through to 14 and 102. Normally, a 15 to 20 psi pressure difference greater than the normal stuffing box pressure (nsp) is required. The reducer 100 is able to maintain the required stuffing box pressure.

It will be obvious to those skilled in the art that various modifications and changes can be made to the system without departing from the spirit and scope of this invention.

We claim:

1. A device for controlling flow and pressure of a fluid, said device comprising,
   - a tubular housing having end caps, the housing having an inlet and outlet end;
   - an inlet barb mounted on the end cap at the inlet of the housing and adapted to sealingly connect with a supply line;
   - an outlet barb mounted on the end cap at the outlet end of the housing and adapted to sealingly connect with a delivery line;
   - a primary spiral tube extending axially within the tubular housing having an end proximate to the inlet end and an end proximate to the outlet end;
   - an inlet tube connected to the inlet barb and extending through the spiral of the primary spiral tube integrally joining with the end of the primary spiral tube proximate to the outlet end of the housing;
   - an outlet tube connected to the outlet barb and extending through the spiral of the primary spiral tube integrally joining with the end of the primary spiral tube proximate to said inlet end of the housing; whereby on closing the end caps on the housing, the ends of the primary spiral tube are urged apart substantially preventing crimping of the primary spiral tube during assembly of the device.

2. A device as claimed in claim 1 wherein the rate of flow reduction through and the pressure drop across the device is proportional to the number of spirals of the primary spiral tube, the inside diameter of the tubes and the overall length of tubes.

3. A device as claimed in claim 2 wherein said device includes an inlet pressure gauge connected to the inlet barb and an outlet pressure gauge connected to the outlet barb.

4. A device as claimed in claim 3 wherein said housing is provided with a graph of the relationship between pressure differential and flow rate whereby the flow rate is readable from the graph after determining the pressure differential between the inlet and outlet pressure gauges.

5. A device for controlling flow and pressure of a fluid, said device comprising,
   - a tubular housing having end caps, the housing having an inlet and outlet end;

an inlet barb mounted on the end cap at the inlet of the housing and adapted to sealingly connect with a supply line;

an outlet barb mounted on the end cap at the outlet end of the housing and adapted to sealingly connect with a delivery line;

a primary spiral tube extending axially within the tubular housing having an end proximate the inlet end and an end proximate to the outlet end;

an inlet tube connected to the inlet barb and extending through the spiral of the primary spiral tube integrally joining with the end of the primary spiral tube proximate to the outlet end of the housing;

an outlet tube connected to the outlet barb and extending through the spiral of the primary spiral tube integrally joining with the end of the primary spiral tube proximate to the inlet end of the housing;

a secondary spiral tube nested within the primary spiral tube having and end proximate to the inlet end of the housing and an end proximate to the outlet end of the housing, a secondary inlet barb mounted on the end cap at the outlet end of the housing;

a secondary outlet barb mounted on the end cap at the inlet end of the housing;

a secondary inlet tube connected to the secondary inlet barb and extending through the spiral of the primary and secondary spiral tubes integrally joining with the end of the secondary spiral tube proximate to the inlet end of the housing;

a secondary outlet tube connected to the secondary outlet barb and extending through the spiral of the primary and secondary spiral tube integrally joining with the end of the secondary spiral tube proximate to the outlet end of the housing, wherein the rate of flow reduction through and the pressure drop across the device is proportional to the number of spirals, the inside diameter and the overall length of each of the primary and secondary spiral tubes, whereby on closing the end caps on the housing, the ends of the primary and secondary spiral tubes are urged apart substantially preventing crimping of the primary and secondary spiral tubes during assembly of the device.

6. A device as claimed in claim 5 wherein said device includes an outlet pressure gauge connected to the outlet barb and an alarm means connected to the secondary inlet for signalling deviations in pressure readings in the pressure gauge from a predetermined calibrated value.

7. A device as claimed in claim 6 wherein said housing is provided with a graph of the relationship between pressure differential and flow rate whereby the flow rate is readable from the graph after determining the pressure differential between the supply line and outlet pressure gauge.

* * * * *